W. C. Grimes,
Corn Planter.
No. 113,761.   Patented Apr. 18, 1871.
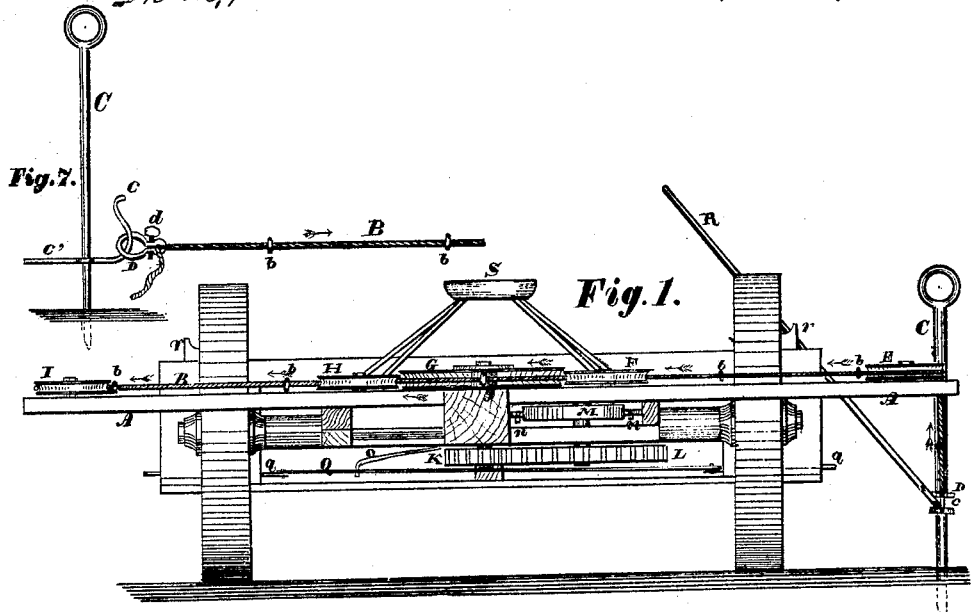
Fig. 7.
Fig. 1.
Witnesses:
William Gabler
Heiner Brock
Inventor,
Wm C Grimes
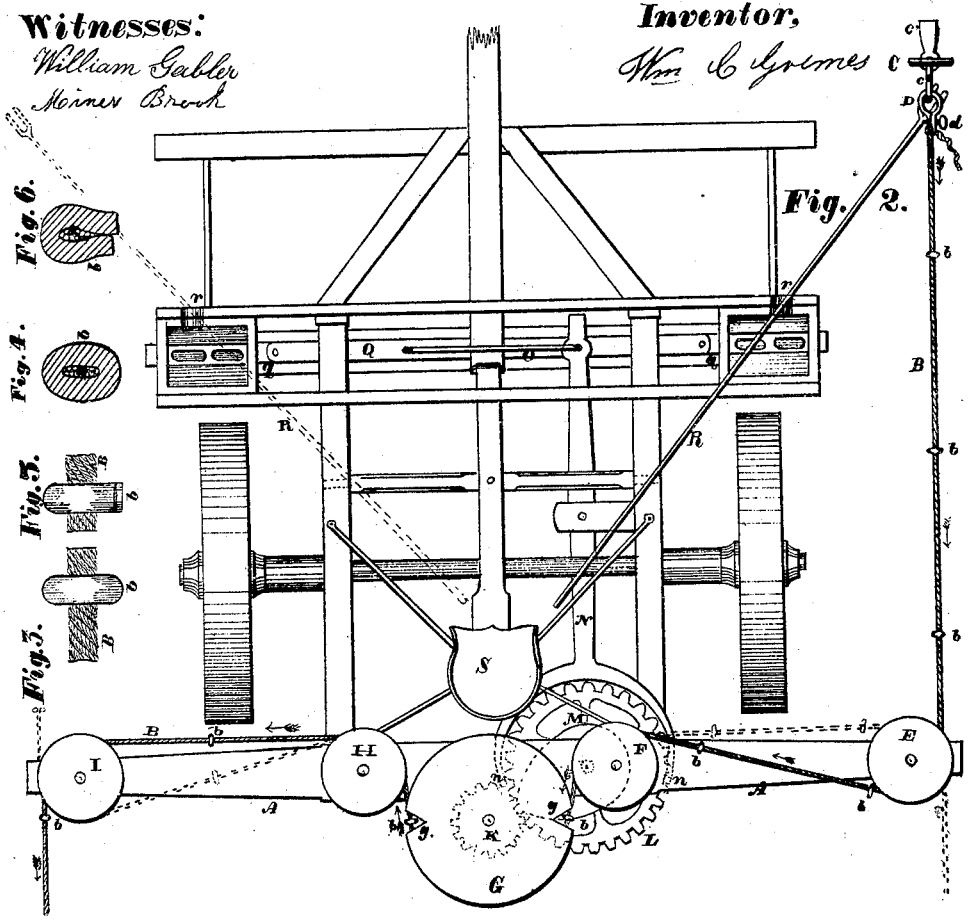
Fig. 6.
Fig. 4.
Fig. 5.
Fig. 3.
Fig. 2.
N. PETERS, PHOTO-LITHOGRAPHER, WASHINGTON, D. C.

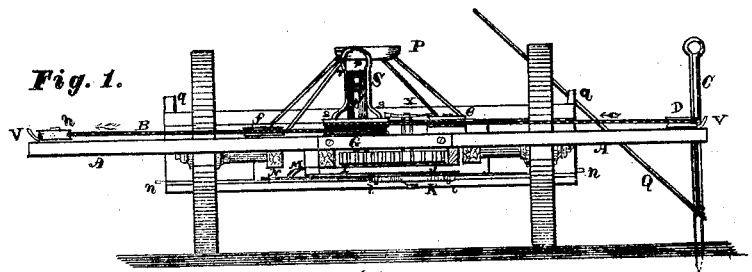
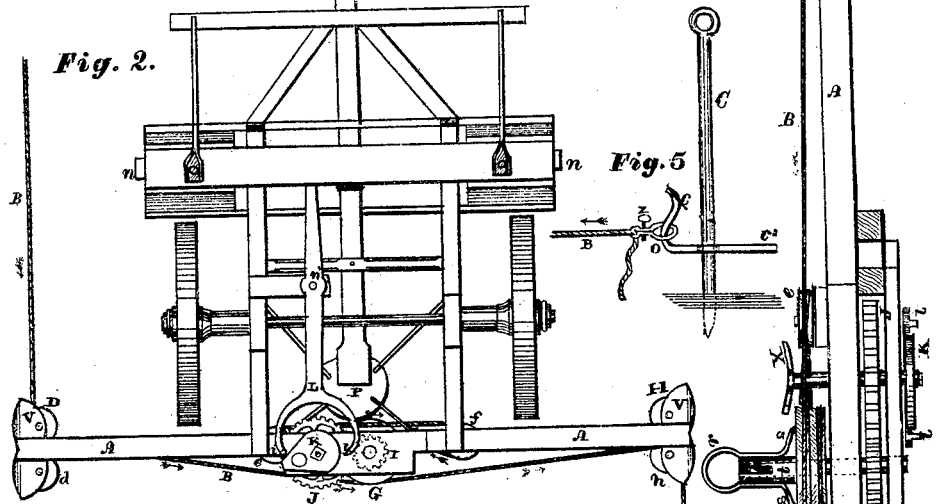
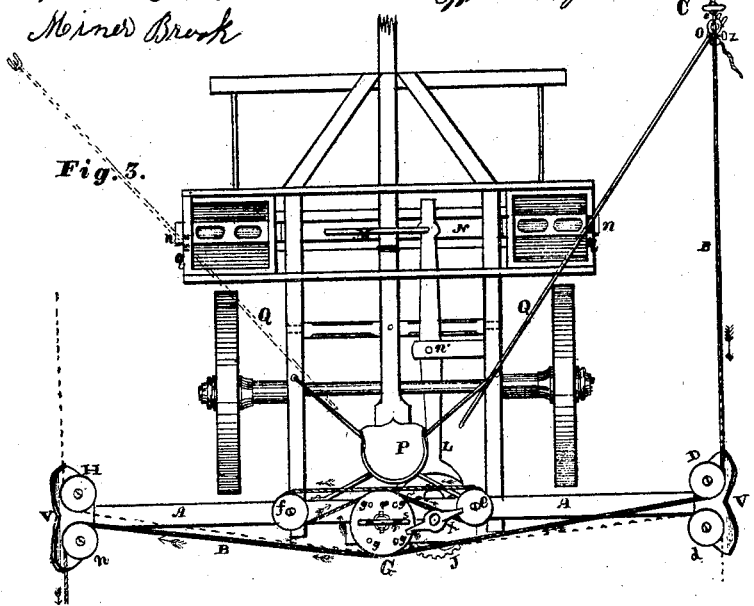

UNITED STATES PATENT OFFICE.

WILLIAM C. GRIMES, OF DECATUR, ILLINOIS.

IMPROVEMENT IN CHECK-ROW ATTACHMENTS FOR CORN-PLANTERS.

Specification forming part of Letters Patent No. 113,761, dated April 18, 1871.

*To all whom it may concern:*

Be it known that I, WILLIAM C. GRIMES, of Decatur, in the county of Macon and State of Illinois, have invented certain Improvements in Check-Row Attachments for Corn-Planters, of which the following is a specification:

The first part of my invention relates to a series of grooved pulleys and a cord passing thereon, arranged so that the cord will not slip on the pulleys, thereby operating the gearing, so that the corn shall be dropped at regular distances apart, doing away with the necessity of using a knotted cord, or a cord with buttons on it.

The second part of my invention relates to the manner of coupling the driving-pulley and the gearing that operates the corn-dropping valves, whereby the machinery may be adjusted to drop the corn at any time and at any point desired.

The third part of my invention relates to the arrangement of the pulleys at the end of the bar, and upon plates formed so that it insures the cord passing from one pulley to the other in turning the machine.

Figure 1 is a rear elevation of a machine embodying my invention. Fig. 2 is a plan of the bottom of the same. Fig. 3 is a plan of the top of the same. Fig. 4 is an enlarged rear view of the attachment. Fig. 5 is a side view of the rod and ring by which the cord is held at the ends of the field.

A is the rear bar of the frame of a corn-planter, to which my machinery is attached. B is the cord, which is fastened at each end of the field, as shown in Fig. 5. The cord passes on the pulley D, and on the top groove in the pulley G; thence on the pulley $e$; thence on the pulley $f$; thence on the pulley H; thence in the lower groove in the pulley G; thence to the pulley H, and to the other end of the field, the direction of the cord being shown by the arrows. The cord being so placed insures the rotation of the pulley G when the machine is drawn. To the shaft of the pulley is attached the pinion-wheel I, said pinion-wheel being geared into the spur-wheel J, on the shaft of which is the eccentric cam K, which works into the forked lever L, striking the ends of the lever, as shown at $l\ l$, thereby causing it to vibrate alternately to the right and to the left, thereby operating the connecting-rod $m$, which is attached to the forked lever L and the rod N, to which the corn-dropping valves $n\ n$ are attached, the lever being pivoted as shown at $n'$. The rod C is provided with a hook, $c$, and a step, $c'$, by which step the rod is forced into the earth by pressing on it with the foot. O is a ring, to which the cord is attached and firmly held by means of the thumb-screw Z compressing the arms of the ring upon the cord.

As the corn-planter arrives at the end of the field, the driver, who is seated upon the seat P, detaches the ring from hook $c$ by using the forked lever Q, there being fulcrums placed upon the seed-box, as shown at $q\ q$, in which he places his lever. Alighting from the corn-planter he withdraws the rod from the earth, and places it in rear of, and in line with, the pulley $h$. Before so doing he must turn the corn-planter around, the end of the bar upon which are the pulleys H $h$ serving as a pivot or guide upon which he turns his machine. The cord is reversed in its position on the pulleys on the ends of the bar, as shown by the dotted lines, the form of the plate V preventing the cord from slipping from the pulleys in turning. The cord is drawn alternately on the pulleys in opposite directions as the machine passes back and forth across the field.

The pulley G, when uncoupled, runs loose upon the shaft, and is coupled to it by the coupling S, formed of the tube $t$, slotted as shown, and being held to the shaft and prevented from having a rotary motion on the same by the key $p$. The tube can be raised up by the ring $r$, and the arms $s\ s$ detached from the holes $g\ g$ in the pulley G.

When it is desired, the pulley G can be uncoupled and the coupling rotated, thereby rotating the shaft and gearing, causing the cam to strike the lever, and drop the corn at the commencement of a row. The pointer X and the cam being on the same shaft, and the pointer being parallel with the longest axis of the cam, shows to the driver, when the guide is parallel with the bar A, that the corn has been dropped.

On some corn-planters it is necessary that the bar to which the machinery is attached shall be fastened in front of the seed-boxes, and the lever and connecting-rod arranged differently.

I claim as my invention—

1. The driving-pulley G and friction-pulleys D, d, e, f, H, and u, in combination with the smooth cord B, pinion-wheel I, spur-wheel J, eccentric cam K, forked lever L, and connecting-rod M, arranged and operating as and for the purpose described.

2. The combination of the pulley G, coupling S, and pointer X, as and for the purpose hereinbefore set forth.

3. The combination, with the bar A, of the plates V V and pulleys D d H h, when the latter are arranged so that the cord will pass from one pulley to the other when the machine is turned, substantially as specified.

WM. C. GRIMES.

Witnesses:
WILLIAM GABLER,
MINER BROOK.